United States Patent
Herrlich et al.

(10) Patent No.: US 10,526,517 B2
(45) Date of Patent: *Jan. 7, 2020

(54) READY-TO-USE HOT MELT ADHESIVE HAVING AN IMPROVED PROPERTY PROFILE

(71) Applicant: CLARIANT INTERNATIONAL LTD., Muttenz (CH)

(72) Inventors: Timo Herrlich, Buehl (DE); Christian Steib, Steppach (DE); Hans-Friedrich Herrmann, Gross-Gerau (DE); Andreas Lang, Augsburg (DE)

(73) Assignee: Clariant International Ltd., Muttenz (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/371,462

(22) Filed: Apr. 1, 2019

(65) Prior Publication Data

US 2019/0225846 A1 Jul. 25, 2019

Related U.S. Application Data

(62) Division of application No. 14/779,305, filed as application No. PCT/EP2014/000648 on Mar. 11, 2014.

(30) Foreign Application Priority Data

Mar. 23, 2013 (DE) .................. 10 2013 005 089

(51) Int. Cl.
  *C09J 191/06* (2006.01)
  *C09J 123/14* (2006.01)

(52) U.S. Cl.
  CPC ......... *C09J 191/06* (2013.01); *C09J 123/142* (2013.01)

(58) Field of Classification Search
  CPC ........ C09J 123/142; C09J 191/06; C08K 5/01
  See application file for complete search history.

(56) References Cited

U.S. PATENT DOCUMENTS

5,723,705 A  3/1998  Hermann et al.
7,825,186 B2  11/2010  Bach et al.
(Continued)

FOREIGN PATENT DOCUMENTS

EP  0 571 882 A1  12/1993
EP  1 631 641 A1  3/2006
(Continued)

OTHER PUBLICATIONS

PCT International Search Report for PCT/EP2014/000648, dated Apr. 10, 2014.

(Continued)

*Primary Examiner* — Shuangyi Abu Ali
(74) *Attorney, Agent, or Firm* — Morgan, Lewis & Bockius LLP

(57) ABSTRACT

The invention relates to a ready-to-use hot melt adhesive containing at least 95% of one or more polyolefin copolymer waxes, which have been prepared by means of metallocene catalysts, characterised in that the polyolefin copolymer wax consists of propylene and one or more further monomers selected from ethylene and branched or unbranched 1-alkenes having 4 to 20 C-atoms and the content of structural units derived from propylene in the copolymer waxes amounts to 80 to 99.9% by weight, and the hot melt adhesive has a surface tension of the melt, measured at a temperature of 170° C., of at most 23 mN/m.

5 Claims, 1 Drawing Sheet

Determination of the temperature/application spectrum $\Delta T_{entropy-el}$ from tan $\delta_{max}$ and tan $\delta_{onset}$ for melt adhesive 3

(56) References Cited

U.S. PATENT DOCUMENTS

| | | | |
|---|---|---|---|
| 8,487,026 B2 | 7/2013 | Bach et al. | |
| 10,287,467 B2 * | 5/2019 | Herrlich | C09J 123/142 |
| 2005/0288412 A1 | 12/2005 | Hoher et al. | |
| 2006/0074171 A1 | 4/2006 | Bach et al. | |
| 2006/0235134 A1 | 10/2006 | Bach et al. | |
| 2007/0117906 A1 | 5/2007 | Bach et al. | |
| 2007/0117907 A1 | 5/2007 | Bach et al. | |

FOREIGN PATENT DOCUMENTS

| | | |
|---|---|---|
| EP | 1 645 608 A1 | 4/2006 |
| EP | 1 788 054 A1 | 5/2007 |
| EP | 1 788 055 A1 | 5/2007 |
| EP | 2 081 609 A1 | 7/2009 |

OTHER PUBLICATIONS

International Preliminary Report on Patentability for PCT/EP2014/000648, dated Aug. 11, 2015.

* cited by examiner

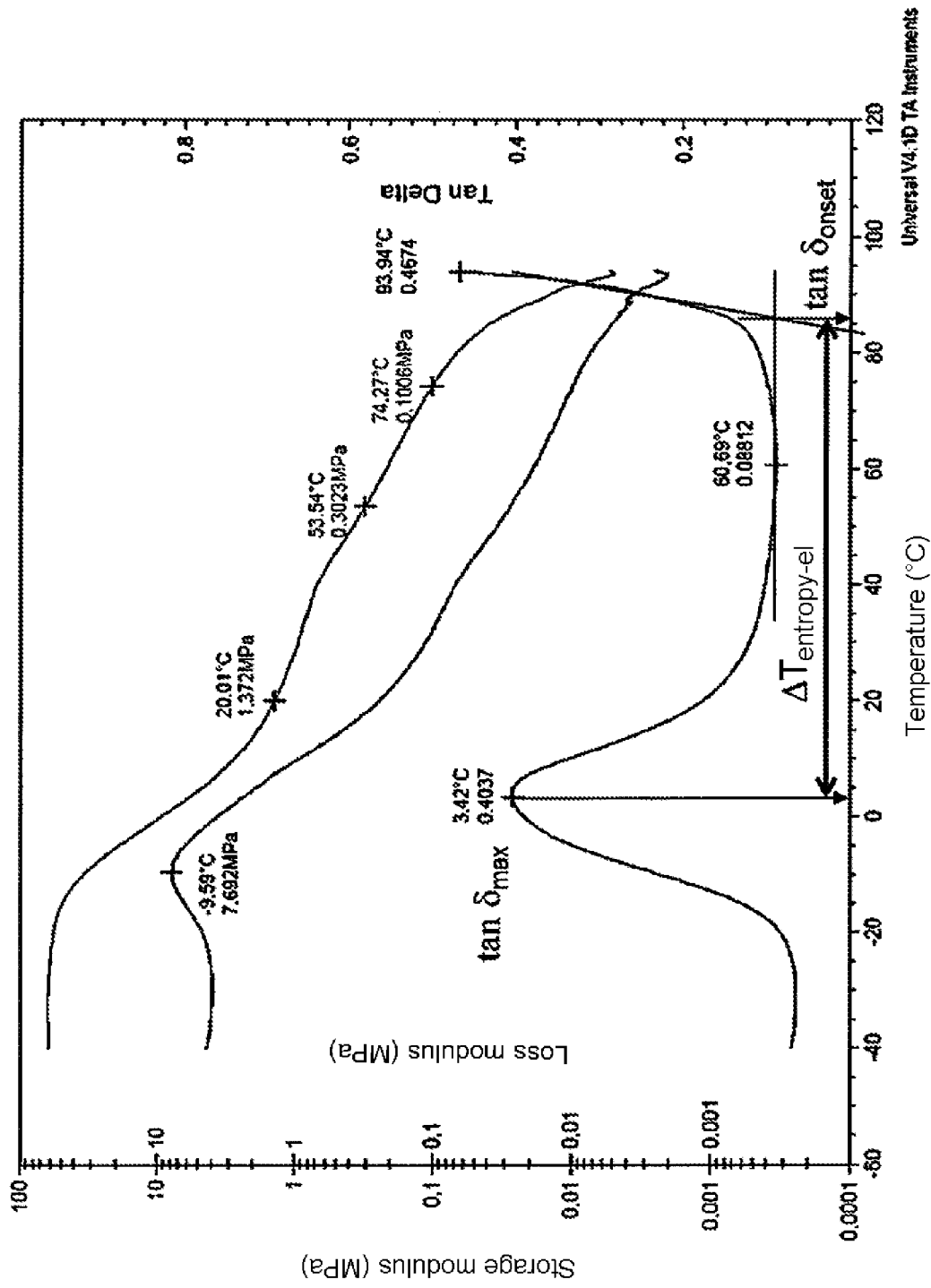

READY-TO-USE HOT MELT ADHESIVE HAVING AN IMPROVED PROPERTY PROFILE

The invention relates to ready-to-use hotmelt adhesives having an improved spectrum of properties (heat distortion resistance, cohesion, adhesion, low VOC, open time), consisting of polyolefin waxes produced using metallocene catalysts.

Hotmelt adhesives or hotmelts are thermoplastic materials which are solid at ambient temperature, and are applied in the liquid-melt state, as strands or layers, to suitable substrate surfaces, where they solidify and then exert different functions. They are constructed preferably on the basis of resins, waxes, thermoplastic polymers, and elastomers, and optionally include additions of fillers, pigments, and additives such as stabilizers, etc.

Hotmelt adhesives may be used, for example, as solvent-free adhesives for bonding. Melt adhesives of this kind are increasingly being used, for their diverse advantages, in industries including packaging, furniture, textiles, and footwear, as an economical and eco-friendly alternative to conventional, solvent-based adhesives. Ingredients of typical melt adhesive formulas are polar or apolar polymers, generally ethylene vinyl acetate copolymers; resins; and waxes.

The polar or apolar polymers in these formulas serve as scaffold material. They ensure the cohesion of the adhesive and at the same time contribute to adhesion to the substrate. The resin addition improves the adhesion effect and may possibly exert a compatibilizing effect on the various components of the adhesive. Waxes are used for modification in fractions of generally less than 10 wt %, based on the melt adhesive compositions. They regulate important physical properties of the adhesives such as, for instance, hardness, melt viscosity, and softening point, and critically influence the performance behavior through their effect on open time, adhesion, cohesion, etc. Employed in quantities of more than 10 wt %, waxes have hitherto been found in general to impair the properties, and more particularly to diminish the bond strength of the hotmelt adhesive.

Waxes employed hitherto in hotmelt adhesives have been macrocrystalline and microcrystalline paraffin waxes, Fischer-Tropsch waxes, and polyolefin waxes. Polyolefin waxes, in delimitation from plastics, refer here to those polyolefins whose melt viscosity at 170° C. is below 40,000 mPa·s.

Polyolefin waxes may be produced by thermal degradation of branched, high-polymer polyolefin plastics, or by direct polymerization of olefins. Examples of suitable polymerization methods include high-pressure technologies, in which the olefins, generally ethylene, are reacted by a radical mechanism at high pressures and temperatures to form branched waxes. Besides this there is the low-pressure or Ziegler method, in which ethylene and/or higher 1-olefins are polymerized at temperatures and pressures which are lower by comparison, with the aid of organometallic catalysts.

Disclosed more recently, as a variant of the low-pressure method, is a procedure wherein metallocene compounds are used as organometallic catalysts. These compounds comprise complexes of titanium, of zirconium, or of hafnium as active species, and are employed generally in combination with cocatalysts, examples being organoaluminum compounds or boron compounds, preferably aluminoxane compounds. The polymerization takes place where necessary in the presence of hydrogen as an agent regulating molar mass.

A feature of metallocene processes is that in comparison with the older Ziegler technology, it is possible to obtain waxes with a narrower molar mass distribution, uniform comonomer incorporation, defined tacticity (e.g., a-, iso-, syndio-, hemiiso-, etc.), lower melting points, and greater catalyst effectiveness.

Melt adhesive mixtures based on abovementioned components (polymer, resin, wax, etc.), especially based on metallocene-catalyzed polyolefins, are known and are already long-established state of the art. Thus, for example, EP1631641 uses polyolefin waxes produced by metallocene catalysis, as a minority-amount component, in melt adhesive mixtures which comprise EVA polymers and hydrocarbon resins as further constituents. EP1645608 describes melt adhesive mixtures whose scaffold substance, and hence more than 50 wt %, is based on a polyolefin copolymer produced by metallocene methods, but which in the embodiments described include hydrocarbon resins as a further constituent. EP2081609 describes the use of melt adhesive mixtures of this kind for the bonding of textile fibers to one another and/or to other smooth substrates in hygiene articles.

There is increasingly a desire, as is known, to obtain melt adhesives without prior compounding of the individual components. This implies that the matrix material unites the functions of resin, wax, and carrier polymer in one substance. This is desirable both for reasons of simplification in production (reduced complexity) of such melt adhesives, and also from the standpoint of environmental compatibility and climate compatibility, through avoidance of unnecessary energy-intensive process steps. EP1645608B1, with a polyolefin wax fraction of >50 wt %, in fact also implies hotmelt adhesives constructed exclusively as one-component systems; however, a suitable one-component embodiment is not described, and nor does the patent specification provide the skilled person with information as to how to produce any such property-combining polyolefin wax and how to carry out selection accordingly, nor how best to compensate the loss of adhesion through omission of a resin.

It has surprisingly been found that a ready-to-use hotmelt composition consisting exclusively of reactor-ready polyolefin waxes produced using metallocene catalysts and having a number-average molar mass of 15,000-25,000 g/mol and a weight-average molar mass of 25,000 to 35,000 g/mol, a dropping point or ring & ball softening point of between 100 and 120° C., a melt viscosity, measured at a temperature of 170° C., of between 8,000 and 15,000 mPa·s, a glass transition temperature of not more than −15° C., and a surface tension at 170° C. of more than 23 mN/m are suitable with particular advantage as one-component hotmelt adhesives. One-component hotmelt adhesives of this kind require no further energy-intensive compounding, and within the polyolefin waxes are notable for improved cohesion, reduced open time, improved heat distortion resistance and low-temperature flexibility, and hence a broader application spectrum. Such one-component hotmelt adhesives are therefore especially suitable for the bonding and laminating of sheetlike textile structures (carpets, mattress covers, spring pockets) and particularly in the context of bonding of low surface energy substrates (e.g., PE, PP, etc.). It has been found, moreover, that one-component hotmelt adhesives of these kinds have a particularly low fraction of volatile organic compounds (low VOC).

BRIEF DESCRIPTION OF THE DRAWINGS

FIG. 1 is a graph showing the determination of the temperature/application spectrum $\Delta T_{entropy-el}$ from tan $\delta_{max}$, and tan $\delta_{onset}$ for melt adhesive 3.

DESCRIPTION

The invention accordingly provides ready-to-use hotmelt adhesives comprising at least 95 wt % of one or more polyolefin waxes produced using metallocene catalysts, the polyolefin copolymer wax consisting of propylene and one or more further monomers selected from ethylene and branched or unbranched 1-alkenes having 4 to 20 C atoms, and the amount of structural units originating from propylene in the copolymer waxes being 80 to 99.9 wt %, and the hotmelt adhesive having a melt surface tension, measured at a temperature of 170° C., of not more than 23 mN/m.

The term "ready-to-use" means in this context that a separately subsequent compounding step after the process of polymerizing the polyolefin waxes of the invention, for the purpose of mixing with other component materials, such as mixing with resin, carrier polymer or wax, for example, is explicitly excluded. Customary additization with minority-amount components add up to a maximum of 5 wt %, preferably up to a maximum of 2 wt %, more preferably a maximum of 0.5 wt %, in contrast, is not excluded, provided it takes place in conjunction with shaping (finishing) after the polymerization process. The term "one-component" refers here to the class of polyolefin wax materials, and therefore implies inter alia, for example, reactor blends of different polyolefin waxes, whereas mixtures of EVA and polyolefin wax and of resin and polyolefin wax should be understood as multicomponent systems not in accordance with the invention.

Suitable polyolefin waxes present in the ready-to-use hotmelt adhesives of the invention include, for example, copolymers of propylene with ethylene and/or with higher 1-olefins or copolymers thereof. Higher 1-olefins used are preferably linear or branched olefins having 4 to 20 C atoms and preferably having 4 to 6 C atoms. Examples of these are 1-butene, 1-hexene, 1-octene, or 1-octadecene. The copolymers consist of one kind of olefin to an extent of preferably 80 to 99.9 and more preferably 85 to 95 wt %.

In one preferred embodiment the copolymers of the ready-to-use hotmelt adhesives of the invention consist of 85 to 95 wt % propylene and 5-15 wt % ethylene.

With preference, copolymers used in accordance with the invention in the ready-to-use hotmelt adhesives of the invention have a melt surface tension, measured at a temperature of 170° C., of not more than 23 mN/m, preferably of not more than 22.5 mN/m.

The polyolefin waxes present in the ready-to-use hotmelt adhesives of the invention preferably have a number-average molar mass $M_n$ of between 15,000 and 25,000 g/mol, more preferably between 17,000 and 22,000 g/mol, and preferably have a weight-average molar mass $M_w$ of between 25,000 and 35,000 g/mol, more preferably between 28,000 and 32,000 g/mol.

The polyolefin waxes present in the ready-to-use hotmelt adhesives of the invention have a dropping point or ring & ball softening point of between 100 and 120° C., preferably between 110 and 120° C., a heat of fusion of 0 to 60 J/g, preferably between 40 and 60 J/g, a melt viscosity, measured at a temperature of 170° C., of between 8,000 and 15,000 mPa·s, preferably between 8,000 and 11,000 mPa·s, and a glass transition temperature (DSC) of not more than −15° C., preferably not more than −20° C.

Polyolefin waxes used in accordance with the invention are prepared using metallocene compounds of the formula (I).

This formula also embraces compounds of the formula (Ia),

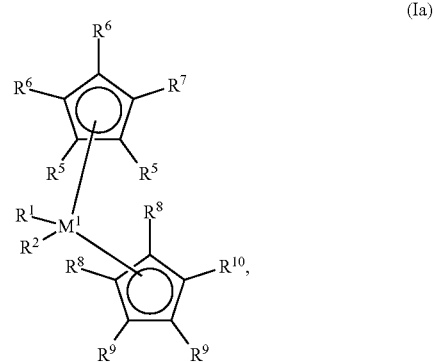

of the formula (Ib)

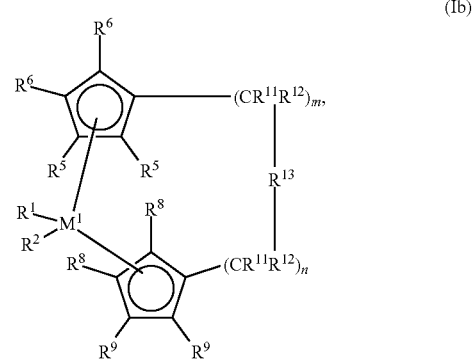

and of the formula (Ic)

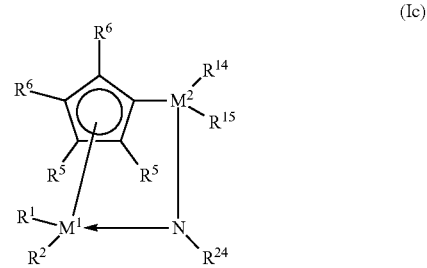

In the formulae (I), (Ia), and (Ib), $M^1$ is a metal from group IVb, Vb, or VIb of the Periodic Table, as for example titanium, zirconium, hafnium, vanadium, niobium, tantalum, chromium, molybdenum, or tungsten, preferably titanium, zirconium, or hafnium.

$R^1$ and $R^2$ are identical or different and are a hydrogen atom, a $C_1$-$C_{10}$, preferably $C_1$-$C_3$ alkyl group, more particularly methyl, a $C_1$-$C_{10}$, preferably $C_1$-$C_3$ alkoxy group, a $C_6$-$C_{10}$, preferably $C_6$-$C_8$ aryl group, a $C_6$-$C_{10}$, preferably $C_6$-$C_8$ aryloxy group, a $C_2$-$C_{10}$, preferably $C_2$-$C_4$ alkenyl group, a $C_7$-$C_{40}$, preferably $C_7$-$C_{10}$ arylalkyl group, a $C_7$-$C_{40}$, preferably $C_7$-$C_{12}$ alkylaryl group, a $C_8$-$C_{40}$, preferably $C_8$-$C_{12}$ arylalkenyl group, or a halogen, preferably chlorine atom.

$R^3$ and $R^4$ are identical or different and are a mono- or polycyclic hydrocarbon radical, which may form a sandwich structure with the central atom $M^1$. Preferably $R^3$ and $R^4$ are cyclopentadienyl, indenyl, tetrahydroindenyl, benzoindenyl, or fluorenyl, and the parent structures may further carry additional substituents or be bridged with one another. Moreover, one of the radicals $R^3$ and $R^4$ may be a substituted nitrogen atom, with $R^{24}$ having the definition of $R^{17}$ and being preferably methyl, tert-butyl or cyclohexyl.

$R^5$, $R^6$, $R^7$, $R^8$, $R^9$, and $R^{10}$ are identical or different and are a hydrogen atom, a halogen atom, preferably a fluorine, chlorine, or bromine atom, a $C_1$-$C_{10}$, preferably $C_1$-$C_4$ alkyl group, a $C_6$-$C_{10}$, preferably $C_6$-$C_8$ aryl group, a $C_1$-$C_{10}$, preferably $C_1$-$C_3$ alkoxy group, a radical —$NR^{16}{}_2$—, —$SR^{16}$—, —$OSiR^{16}{}_3$—, —$SiR^{16}{}_3$—, or —$PR^{16}{}_2$, in which $R^{16}$ is a $C_1$-$C_{10}$, preferably $C_1$-$C_3$ alkyl group or $C_6$-$C_{10}$, preferably $C_6$-$C_8$ aryl group or else, in the case of radicals containing Si or P, is a halogen atom, preferably chlorine atom, or two adjacent radicals $R^5$, $R^6$, $R^7$, $R^8$, $R^9$, or $R^{10}$ form a ring with the C atoms connecting them. Particularly preferred ligands are the substituted compounds of the parent structures cyclopentadienyl, indenyl, tetrahydroindenyl, benzoindenyl or fluorenyl.

$R^{13}$ is

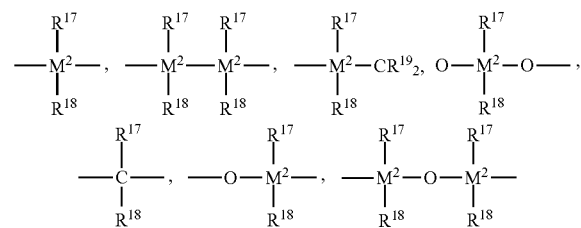

=$BR^{17}$, =$AlR^{17}$, —Ge—, —Sn—, —O—, —S—, =SO, =$SO_2$, =$NR^{17}$, =CO, =$PR^{17}$ or =$P(O)R^{17}$, with $R^{17}$, $R^{18}$, and $R^{19}$ being identical or different and being a hydrogen atom, a halogen atom, preferably a fluorine, chlorine, or bromine atom, a $C_1$-$C_{30}$, preferably $C_1$-$C_4$ alkyl group, more particularly methyl group, a $C_1$-$C_{10}$ fluoroalkyl, preferably $CF_3$ group, a $C_6$-$C_{10}$ fluoroaryl, preferably pentafluorophenyl group, a $C_6$-$C_{10}$, preferably $C_6$-$C_8$ aryl group, a $C_1$-$C_{10}$, preferably $C_1$-$C_4$ alkoxy group, more particularly methoxy group, a $C_2$-$C_{10}$, preferably $C_2$-$C_4$ alkenyl group, a $C_7$-$C_{40}$, preferably $C_7$-$C_{10}$ aralkyl group, a $C_8$-$C_{40}$, preferably $C_8$-$C_{12}$ arylalkenyl group, or a $C_7$-$C_{40}$, preferably $C_7$-$C_{12}$ alkylaryl group, or $R^{17}$ and $R^{18}$ or $R^{17}$ and $R^{19}$ form a ring in each case together with the atoms connecting them.

$M^2$ is silicon, germanium, or tin, preferably silicon and germanium. $R^{13}$ is preferably =$CR^{17}R^{18}$, =$SiR^{17}R^{18}$, =$GeR_{17}R^{18}$, —O—, —S—, =SO, =$PR^{17}$, or =$P(O)R^{17}$.

$R^{11}$ and $R^{12}$ are identical or different and have the definitions stated for $R^{17}$. m and n are identical or different and are zero, 1, or 2, preferably zero or 1, with m plus n being zero, 1, or 2, preferably zero or 1.

$R^{14}$ and $R^{15}$ have the definition of $R^{17}$ and $R^{18}$.

Examples of suitable metallocenes are as follows:
bis(1,2,3-trimethylcyclopentadienyl)zirconium dichloride,
bis(1,2,4-trimethylcyclopentadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methyl-cyclopentadienyl)zirconium dichloride,
bis(2-methyl-4,6-diisopropylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride,
bis(trimethylsilylcyclopentadienyl)zirconium dichloride,
biscyclopentadienylzirconium dibenzyl,
biscyclopentadienylzirconium dimethyl,
bistetrahydroindenylzirconium dichloride,
dimethylsilyl-9-fluorenylcyclopentadienylzirconium dichloride,
dimethylsilylbis-1-(2,3,5-trimethylcyclopentadienyl)zirconium dichloride,
dimethylsilylbis-1-(2,4-dimethylcyclopentadienyl)zirconium dichloride,
dimethylsilylbis-1-(2-methyl-4,5-benzoindenyl)zirconium dichloride,
dimethylsilylbis-1-(2-methyl-4-ethylindenyl)zirconium dichloride,
dimethylsilylbis-1-(2-methyl-4-isopropylindenyl)zirconium dichloride,
dimethylsilylbis-1-(2-methyl-4-phenylindenyl)zirconium dichloride,
dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenylzirconium dimethyl,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzoindenyl)zirconium dichloride,
ethylenebis-1-(2-methyl-4-phenylindenyl)zirconium dichloride,
ethylenebis-1-(2-methyl-tetrahydroindenyl)zirconium dichloride,
ethylenebis-1-(4,7-dimethylindenyl)zirconium dichloride,
ethylenebis-1-indenylzirconium dichloride,
ethylenebis-1-tetrahydroindenylzirconium dichloride,
indenylcyclopentadienylzirconium dichloride
isopropylidene(1-indenyl)(cyclopentadienyl)zirconium dichloride,
isopropylidene(9-fluorenyl)(cyclopentadienyl)zirconium dichloride,
phenylmethylsilylbis-1-(2-methylindenyl)zirconium dichloride, and also in each case the alkyl or aryl derivatives of these metallocene dichlorides.

The single-center catalyst systems are activated using suitable cocatalysts. Suitable cocatalysts for metallocenes of the formula (I) are organoaluminum compounds, more particularly aluminoxanes, or else aluminum-free systems such as $R^{20}{}_x NH_{4-x} BR^{21}{}_4$, $R^{20}{}_x PH_{4-x} BR^{21}{}_4$, $R^{20}{}_3 CBR^{21}{}_4$, or $BR^{21}{}_3$. In these formulae, x is a number from 1 to 4, the radicals $R^{20}$ are identical or different, preferably identical, and are $C_1$-$C_{10}$ alkyl or $C_6$-$C_{18}$ aryl, or two radicals $R^{20}$ form a ring together with the atom connecting them, and the radicals $R^{21}$ are identical or different, preferably identical, and are $C_6$-$C_{18}$ aryl, which may be substituted by alkyl, haloalkyl, or fluoro. More particularly, $R^{20}$ is ethyl, propyl, butyl or phenyl, and $R^{21}$ is phenyl, pentafluorophenyl, 3,5-bistrifluoromethylphenyl, mesityl, xylyl or tolyl.

Additionally a third component is often necessary in order to maintain protection from polar catalyst poisons. Suitable for this purpose are organoaluminum compound such as, for example, triethylaluminum, tributylaluminum, and others, and also mixtures.

Depending on process, supported single-center catalysts may also be used. Preferred catalyst systems are those in which the residual amounts of support material and cocatalyst do not exceed a concentration of 100 ppm in the product.

In the case of processes described above, the use of mixtures of single-center catalysts with different stereoselectivites and/or different activities, in supported and also unsupported form, is also possible. The products produced in the case of a process variant of this kind are referred to as reactor blends. The polymers obtained in the case of this process variant are considered a uniform class of material, owing to the identity of monomer building blocks, and therefore as one-component systems. The polyolefin waxes of the invention therefore also include reactor blends. In the present invention these are metallocene-based polyolefin waxes, more particularly ethylene-propylene copolymers, for example.

The ethylene-propylene-based copolymer waxes produced by processes described above have a profile of properties which is particularly advantageous for the ready-to-use hotmelt adhesives of the invention. The advantageous profile of properties includes the following: high cohesion, without being brittle in the application; a broad temperature/application spectrum, limited at the bottom end by glass transition temperature and at the top end by softening temperature; a melt surface tension at 170° C.<23 mN/m for improved wetting, particularly of low surface energy surfaces, such as polyolefin surfaces, for example; a short open time, for high working speeds.

The present invention therefore provides ready-to-use one-component hotmelt adhesives based on polyolefin waxes produced by metallocene catalysis. In terms of its physical and chemical properties, the ready-to-use one-component hotmelt adhesive preferably corresponds exactly to the polyolefin wax or to the polyolefin wax reactor blend.

The ready-to-use hotmelt adhesives of the invention preferably have a dropping point or ring & ball softening point of between 100 and 120° C., a melt viscosity, measured at a temperature of 170° C., of between 8,000 and 15,000 mPa·, a glass transition temperature (DSC) of not more than −15° C., and a melt surface tension, measured at a temperature of 170° C., of not more than 23 mN/m.

The ready-to-use hotmelt adhesives of the invention more preferably have a dropping point or ring & ball softening point of between 110 and 120° C., a melt viscosity, measured at a temperature of 170° C., of between 8,000 and 11,000 mPa·s, a glass transition temperature (DSC) of not more than −20° C., and a melt surface tension, measured at a temperature of 170° C., of not more than 23 mN/m.

In accordance with the invention the ready-to-use hotmelt adhesives are notable for a particularly broad temperature/application spectrum by comparison with EVA-based melt adhesives. For the ready-to-use hotmelt adhesives, this is manifested in an entropy-elastic range from 80 to 110° C. The entropy-elastic range $\Delta T_{entropy-el}(\tan \delta)$ is determined from the difference of the maximum for the loss factor tan $\delta_{max}$ and the softening point in the DMA (onset of the loss factor tan $\delta_{onset}$). The loss modulus profile is measured by means of DMA measurement in accordance with DIN ISO 6721-1. The maximum of the loss factor tan $\delta_{max}$ is determined according to ASTM D 4065-99, while the onset of the loss factor at the softening point is determined by way of the tangent method (see FIG. 1).

The ready-to-use hotmelt adhesives of the invention may further comprise polyolefin polymers, resins, waxes, plasticizers, polar or apolar polymers, pigments, fillers, stabilizers and/or antioxidants in customary additive concentrations.

Further provided by the invention is the use of the ready-to-use hotmelt adhesives of the invention as melt adhesives. The ready-to-use hotmelt adhesives consist preferably to an extent of 95 to 100 wt %, more preferably 98 to 100 wt %, very preferably 99 to 100 wt %, of the polyolefin waxes described above.

The ready-to-use hotmelt adhesive of the invention finds use in the bonding, laminating, fixing, and coating of sheet-like structures of any kind, such as carpet reverse-face coating, artificial turf reverse-face coating, adhesive bonding of spring pockets (mattresses), nonwovens, or of non-woven-web materials. The ready-to-use hotmelt adhesive of the invention is also suitable for producing any of a very wide variety of hygiene articles, such as diapers, training pants, incontinence products, panty liners, and sanitary towels, more particularly for the laminating of fiber materials such as nonwoven-web materials with film.

In view of the improved mechanical properties, the ready-to-use hotmelt adhesive of the invention can also be used as a binder for the production of road surfacing.

The ready-to-use hotmelt adhesive of the invention is suitable with particular advantage for the bonding, laminating, and fixing of substrates with a total surface energy of $\gamma_{tot}$<30 mN/m, referred to as low surface energy substrates. These include, in particular, polypropylene and polyethylene. Such substrates preferably have a low polar component $\gamma_p$<2 mN/m in the total surface energy. The latter is obtained from the sum of the polar and disperse surface energy components: $\gamma_{tot} = \gamma_p + \gamma_d$ The examples which follow are intended to elucidate the invention in more detail, but without confining it to them.

EXAMPLES

The melt viscosities were determined according to DIN 53019 with a rotary viscometer, the dropping points according to DIN 51801/2, the ring & ball softening point according to DIN EN 1427. The glass transition temperatures and also the enthalpies of fusion were determined by means of differential thermal analysis according to DIN EN ISO 11357-1 from −50 to 200° C. at a heating rate of 10 K/min under nitrogen.

The molar mass weight average $M_w$, the molar mass number average $M_n$, and the resulting quotient $M_n/M_W$ (PDI) were determined by gel permeation chromatography at 135° C. in 1,2-dichlorobenzene with reference to a PP standard.

The surface tension of the hotmelt adhesives and of the polyolefin waxes is determined by means of the "pendant drop" method, with the aid of a heated measurement chamber and of a heated ceramic needle at 170° C.

The melt densities required for this measurement were determined likewise at 170° C.

The volatility was determined by thermogravimetry via TGA measurements under nitrogen. For this purpose, around 10 mg of sample were heated to 300° C. at a heating rate of 5 K/min, and the loss in mass was recorded. The measurement was made under a nitrogen atmosphere with an $N_2$ flow rate of 50 ml/min.

The metallocene-polyolefin waxes listed in table 1 were produced by the processes indicated in EP-A-0 571 882. For a given catalyst system and given comonomer ratio, the molecular weight was regulated via the hydrogen partial pressure as molar mass regulator.

Examples 1-13 show a selection of typical ethylene-propylene based copolymer waxes and their profile of properties (melt viscosity, EWP, surface tension, enthalpy of fusion, glass transition temperature), sorted according to ascending softening temperature. In the subsequent application as melt adhesives, the softening temperature has a direct influence on the heat distortion resistance and hence on the maximum service temperature after bonding has taken place. The glass transition temperature has a direct influence on the low-temperature flexibility of an adhesive bond. In addition, the enthalpy of fusion (as a measure of the crystallinity) limits the toughness and cohesion of the adhesive material after bonding. Melt viscosity and melt surface tension, in contrast, are significant for the applicability of the liquid melt adhesive. A low surface tension here leads to more effective wetting of the surface.

Examples 5, 6, 9, 10, and 11, with a constant propylene content of 89 wt % and 11 wt % ethylene, show a change in the profile of properties with increasing molecular weight. The molecular weight here was controlled by way of the hydrogen partial pressure during the polymerization. Accordingly, the increase in the molecular weight leads to an increase in the melt viscosity, in the softening point, in the crystallinity in the form of the enthalpy of fusion, and in the melt surface tension. At the same time there is a decrease in volatility with increasing molecular weight.

The intention below is to show that the ethylene-propylene copolymer wax of the invention (example 5) fulfills, in a particularly suitable way, the performance requirements of a ready-to-use melt adhesive in the sense according to the invention.

A. Use in Melt Adhesive Formulas

Using the waxes listed in table 1, melt adhesive compositions were produced according to the mixing ratios set out in table 2. The components were jointly melted and stirred at 180° C. for 1 hour.

To test the cohesion, moldings were made from the mixtures in accordance with DIN 53455, and the mechanical stability of these moldings was tested in a tensile test.

The temperature/application spectrum was determined by way of the entropy-elastic range $\Delta T_{entropy-el}(\tan \delta)$ and is obtained from the difference of the maximum of the loss factor ($\tan \delta_{max}$) and the onset of the loss factor ($\tan \delta_{onset}$): $\Delta T_{entropy-el} = T(\tan \delta_{onset}) - T(\tan \delta_{max})$. The loss factor was determined by DMA measurement according to DIN ISO 6721-1. The maximum of the loss factor ($\tan \delta max$) was determined according to ASTM D 4065-99, while the onset of the loss factor at the softening point was determined via the tangent method (see FIG. 1). The heating rate for the DMA measurement was 3 K/min, the amplitude 20 µm, and the measurement frequency 1 Hz. The molded specimen geometry was always 2 mm×3.5 mm×12.82 mm.

The open time was determined after melting of the melt adhesive compositions set out in table 2, at 140° C., for a 500 µm film of melt knife-coated on an uncoated cardboard surface. In addition, within seconds, paper strips (1 cm×5 cm) were pressed onto the film of melt as it cooled. Following complete hardening of the melt adhesive, the paper strips are peeled off. When there is no complete fiber extraction at the bond site, the end of the open time has been reached.

The application-relevant determination of the maximum pull strength of the bond between two pockets of a pocket-sprung mattress, and hence of the adhesion, was made using mechanically bonded spring pockets by a tensile test in analogy to ASTM D751. For this purpose, an area of 10 cm×10 cm of the bonded pockets was cut out at the bond face and measured under tension. The pocket material consisted of a PP-based nonwoven.

TABLE 1

Properties of various ethylene-propylene polyolefin copolymer waxes

| Example | Propylene content [wt %] | SFP [° C.] | Heat of fusion DSC [J/g] | $M_w$ [g/mol] | $M_n$ [g/mol] | PDI | Melt viscosity 170° C. [mPas] | Glass transition temperature DSC [° C.] | Surface tension 170° C. [mN/m] | Volatility TGA [% @ 300° C.] |
|---|---|---|---|---|---|---|---|---|---|---|
| 1 (comp.) | 90 | 86 | 31 | 22 100 | 13 300 | 1.7 | 1800 | −28 | 21.6 | 0.5 |
| 2 (comp.) | 91 | 88 | 30 | 29 700 | 18 500 | 1.6 | 7000 | −26 | 23.1 | 0.1 |
| 3 (comp.) | 90 | 90 | 36 | 8700 | 6000 | 1.5 | 200 | −30 | 20.8 | 0.7 |
| 4 (comp.) | | 99 | 52 | 22 300 | 13 100 | 1.7 | 1500 | −24 | 21.5 | 0.5 |
| 5 (comp.) | 89 | 100 | 46 | 29 700 | 17 900 | 1.7 | 6300 | −24 | 22.5 | 0.2 |
| 6 (comp.) | 89 | 103 | 44 | 26 300 | 14 600 | 1.8 | 7800 | −21 | 21.8 | 0.5 |
| 7 (comp.) | | 107 | | 8800 | 5200 | 1.7 | 1300 | n.b. | n.b. | n.b. |
| 8 (comp.) | | 108 | 44 | 19 800 | 7900 | 2.5 | 2300 | n.b. | 22.9 | n.b. |
| 9 (inv.) | 89 | 117 | 54 | 30 800 | 20 700 | 1.5 | 8900 | −20 | 21.9 | 0.1 |
| 10 (comp.) | 89 | 120 | 64 | 32 300 | 21 700 | 1.5 | 9200 | −20 | 22.2 | 0.2 |
| 11 (comp.) | 89 | 135 | 77 | 35 300 | 22 800 | 1.5 | 9500 | | n.b | 0.1 |
| 12 (comp.) | | | 48 | | | | 60 | −25 | n.b. | 1.1 |
| 13 (comp.) | 100 | 145 | 108 | 7200 | 4600 | 1.6 | 60 | n.a. | 19.5 | 2.6 | n.b. not determined
n.a. not determinable
SFP: softening point

TABLE 2

Melt adhesives and formula mixtures for application

| Melt adhesive | Wax ex 1 [wt %] | Wax ex 2 [wt %] | Wax ex 5 [wt %] | Wax ex 6 [wt %] | Wax ex 9 (inv.) [wt %] | Wax ex 10 [wt %] | Elvax ® 220 [wt %] | APAO [wt %] | Resin [wt %] | Licocene ® PE 4201 [wt %] | EVA hotmelt Forbo |
|---|---|---|---|---|---|---|---|---|---|---|---|
| 1 (comp.) | 100 | — | — | — | — | — | — | — | — | — | — |
| 2 (comp.) | — | 100 | — | — | — | — | — | — | — | — | — |
| 3 (comp.) | — | — | 100 | — | — | — | — | — | — | — | — |
| 4 (comp.) | — | — | — | 100 | — | — | — | — | — | — | — |
| 5 (inv.) | — | — | — | — | 100 | — | — | — | — | — | — |
| 6 (comp.) | — | — | — | — | — | 100 | — | — | — | — | — |
| 7 (comp.) | — | — | — | — | — | — | 100 | — | — | — | — |
| 8 (comp.) | — | — | — | — | — | — | — | 100 | — | — | — |
| 9 (inv.) | — | — | — | — | 96 | — | — | — | 4 | — | — |
| 10 (inv.) | — | — | — | — | — | 96 | — | — | 4 | — | — |
| 11 (comp.) | — | — | 97 | — | — | — | — | — | — | 3 | — |
| 12 (comp.) | — | — | 94 | — | — | — | — | — | — | 6 | — |
| 13 (comp.) | — | — | — | — | — | — | — | — | — | — | 100 |

Elvax ® 220: ethylene-vinyl acetate copolymer, manufacturer Dupont AG
Regalite ® 1140: hydrocarbon resin, manufacturer Eastman
Licocene ® PE 4201: polyethylene wax
Forbo: EVA hotmelt (consisting of resin, EVA)
n.b. not determined
n.a. not determinable
SFP: softening point

TABLE 3

Peformance-relevant properties of reactor-ready melt adhesives in the examples: bonding of the pockets of pocket-sprung mattresses, and reverse-face coating of artificial turf.

| Melt adhesive | | Melt viscosity 170° C. [mPas] | Glass transition temperature DSC [° C.] | SFP [° C.] | $\Delta T_{entropy-el}$ (temperature/application spectrum) | Surface tension 170° C. [mN/m] | Cohesion [N/mm$^2$] | Open time 140° C. [s] | Pull strength between 2 pockets [N] | Flexibility during roll-up of coated artificial turf [qualitative] |
|---|---|---|---|---|---|---|---|---|---|---|
| 1 (comp.) | E, P copolymer | 1800 | −28 | 86 | 88 | 21.6 | 3.2 | 50 | | does not rupture |
| 2 (comp.) | E, P copolymer | 7000 | −26 | 88 | 83 | 23.1 | 4.9 | 70 | | does not rupture |
| 3 (comp.) | E, P copolymer | 6300 | −24 | 100 | 82 | 22.5 | 9.3 | 35 | 77 | does not rupture |
| 4 (comp.) | E, P copolymer | 7800 | −21 | 103 | 84 | 21.8 | 10.5 | 15 | | does not rupture |
| 5 (inv.) | E, P copolymer | 8900 | −20 | 117 | 101 | 21.9 | 16.7 | 5 | 88 | does not rupture |
| 6 (comp.) | E, P copolymer | 9200 | −20 | 120 | 103 | 22.2 | 18.3 | 2 | | ruptures |
| 7 (comp.) | EVA | >100000 | −34 | 70 | 76 | | 7.5 | 35 | | does not rupture |
| 8 (comp.) | APAO | 4000 | −28 | +124 | 89 | | 1.0 | 18 | | does not rupture |
| 9 (inv.) | E, P copolymer + resin | 9600 | −18 | 116 | 99 | | 16.4 | 7 | 89 | does not rupture |
| 10 (comp.) | EVA + resin | 93300 | −32 | 70 | 73 | | 7.4 | 55 | | does not rupture |
| 11 (comp.) | E, P- copolymer + ethylene wax | 5600 | −22 | 124 | 91 | 23.3 | 8.9 | 10 | | does not rupture |
| 12 (comp.) | E, P copolymer + ethylene wax | 5000 | −21 | 126 | 3 | 22.9 | 7.4 | 5 | | does not rupture |
| 13 (comp.) | EVA hotmelt | 4000 | | 83 | 49 | | | 6 | 76 | does not rupture |

Melt adhesives 5 and 9 fulfill the profile of properties according to the invention for a ready-to-use melt adhesive, with a temperature/application spectrum, broad in the inventive sense, with a short open time, and with a high melt adhesive cohesion. The melt surface tension <23 mN/m at 170° C. suggests effective wetting of the surface to be bonded. Comparative examples 1-4, 6-8, and 10-13 fail to meet the required profile of properties in at least one property (open time, toughness, strength, flexibility, temperature/application spectrum).

The examples for the ethylene-propylene polyolefin copolymer waxes in table 1 and table 3 show that an increase in the softening point and hence in the distortion resistance usually correlates with an increase in the crystallinity and at the same time with the loss of the flexibility. This problem has been counterable to date only by corresponding compounding. Melt adhesive 5, even without compounding, shows an optimum combination of properties for the application (FIG. 1).

What is claimed is:

1. A bonding, laminating and fixing low surface energy substrate having a surface energy of less than 30 mN/m, where the low surface energy substrate comprises a ready-to-use hotmelt adhesive comprising at least 95 wt % of one or more polyolefin copolymer waxes produced using metallocene catalysts, wherein the polyolefin copolymer wax consists of propylene and one or more further monomers selected from the group consisting of ethylene and branched or unbranched 1-alkenes having 4 to 20 carbon atoms and comprises units of propylene and ethylene, and where the amount of structural units originating from the propylene in the copolymer wax is between 85 and 95 wt %, wherein the polyolefin copolymer wax has a number-average molar mass $M_n$ in the range of 15,000 and 25,000 g/mol and a weight-average molar mass $M_w$ in the range of 25,000 and 35,000 g/mol, a dropping point or ring and ball softening point in the range of 100 and 120° C., a heat of fusion of not more than 60 J/g, a melt viscosity, measured at a temperature of 170° C., of 8,000 to 15,000 mPa·s, and a glass transition temperature of not more than −15° C., and wherein the hotmelt adhesive has a melt surface tension, measured at a temperature of 170° C., of not more than 23 mN/m, wherein the hotmelt adhesive has an entropy-elastic temperature range $\Delta T_{entropy-el}(\tan \delta)$, measured as the difference from glass transition temperature Tg ($\tan \delta_{max}$) from loss factor and softening temperature (onset of the loss modulus $\tan \delta_{onset}$) of 80 to 110° C.

2. The low surface energy substrate as claimed in claim 1, wherein the polyolefin copolymer waxes are present in the hotmelt adhesives in fractions between 95 and 100 wt %.

3. A hotmelt as a ready-to-use hotmelt adhesive for coating the reverse of sheetlike structures, wherein the ready-to-use hotmelt adhesive comprises at least 95 wt % of one or more polyolefin copolymer waxes produced using metallocene catalysts, wherein the polyolefin copolymer wax consists of propylene and one or more further monomers selected from the group consisting of ethylene and branched or unbranched 1-alkenes having 4 to 20 carbon atoms and comprises units of propylene and ethylene, and where the amount of structural units originating from the propylene in the copolymer wax is between 85 and 95 wt %, wherein the polyolefin copolymer wax has a number-average molar mass $M_n$ in the range of 15,000 and 25,000 g/mol and a weight-average molar mass $M_w$ in the range of 25,000 and 35,000 g/mol, a dropping point or ring and ball softening point in the range of 100 and 120° C., a heat of fusion of not more than 60 J/g, a melt viscosity, measured at a temperature of 170° C., of 8,000 to 15,000 mPa·s, and a glass transition temperature of not more than −15° C., and wherein the hotmelt adhesive has a melt surface tension, measured at a temperature of 170° C., of not more than 23 mN/m, wherein the hotmelt adhesive has an entropy-elastic temperature range $\Delta T_{entropy-el}(\tan \delta)$, measured as the difference from glass transition temperature Tg ($\tan \delta_{max}$) from loss factor and softening temperature (onset of the loss modulus $\tan \delta_{onset}$) of 80 to 110° C.

4. A ready-to-use hotmelt adhesive for bonding, laminating, fixing and coating sheetlike textile structures, where the ready-to-use hotmelt adhesive comprises at least 95 wt % of one or more polyolefin copolymer waxes produced using metallocene catalysts, wherein the polyolefin copolymer wax consists of propylene and one or more further monomers selected from the group consisting of ethylene and branched or unbranched 1-alkenes having 4 to 20 carbon atoms and comprises units of propylene and ethylene, and where the amount of structural units originating from the propylene in the copolymer wax is between 85 and 95 wt %, wherein the polyolefin copolymer wax has a number-average molar mass $M_n$ in the range of 15,000 and 25,000 g/mol and a weight-average molar mass $M_w$ in the range of 25,000 and 35,000 g/mol, a dropping point or ring and ball softening point in the range of 100 and 120° C., a heat of fusion of not more than 60 J/g, a melt viscosity, measured at a temperature of 170° C., of 8,000 to 15,000 mPa·s, and a glass transition temperature of not more than −15° C., and wherein the hotmelt adhesive has a melt surface tension, measured at a temperature of 170° C., of not more than 23 mN/m, wherein the hotmelt adhesive has an entropy-elastic temperature range $\Delta T_{entropy-el}(\tan \delta)$, measured as the difference from glass transition temperature Tg ($\tan \delta_{max}$) from loss factor and softening temperature (onset of the loss modulus $\tan \delta_{onset}$) of 80 to 110° C.

5. The ready-to-use hotmelt adhesive as claimed in claim 4, wherein the sheetlike textile structures are selected from the group consisting of carpets, artificial turf, mattress covers, spring pockets, diapers and nonwovens.

* * * * *